No. 833,825. PATENTED OCT. 23, 1906.
J. P. CLEAL.
CHECK AND SLIP PRINTING CASH REGISTER.
APPLICATION FILED MAR. 15, 1904.
3 SHEETS—SHEET 1.
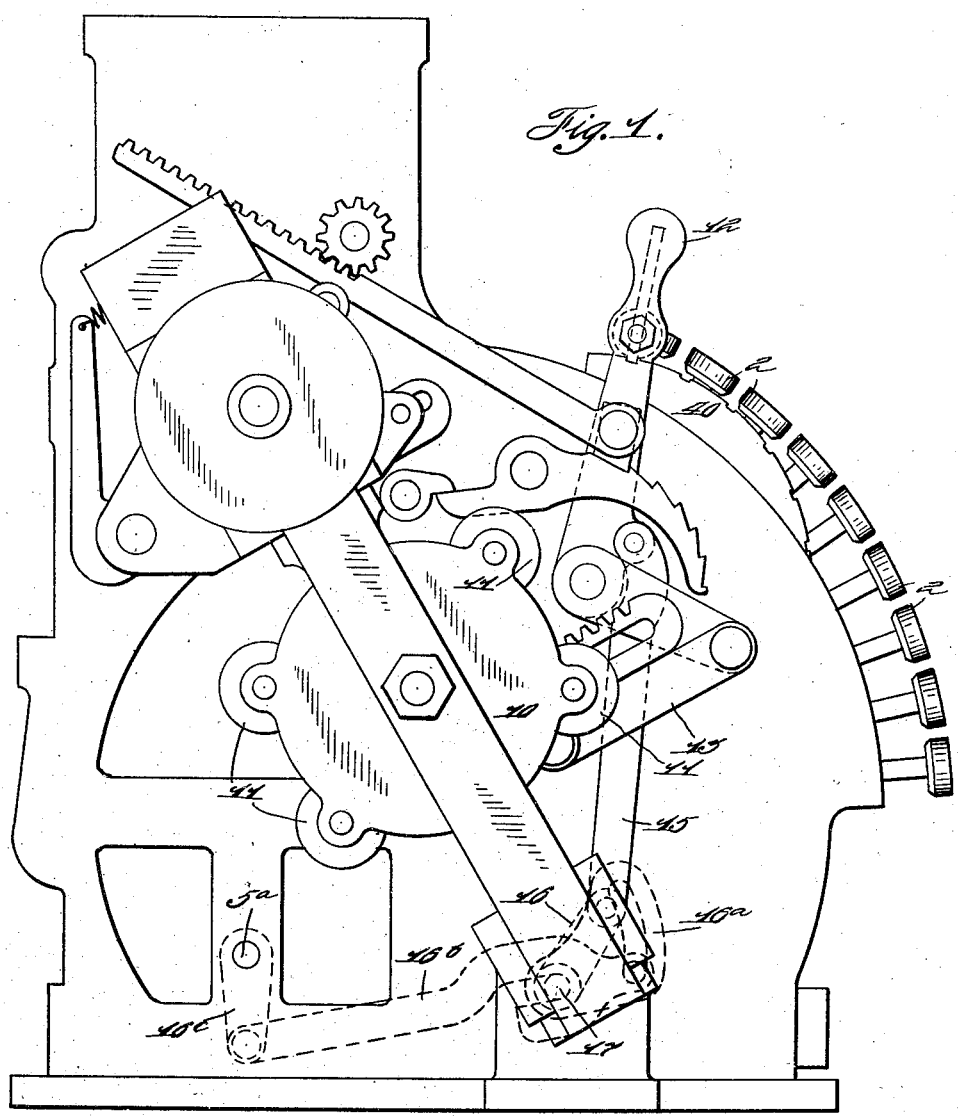

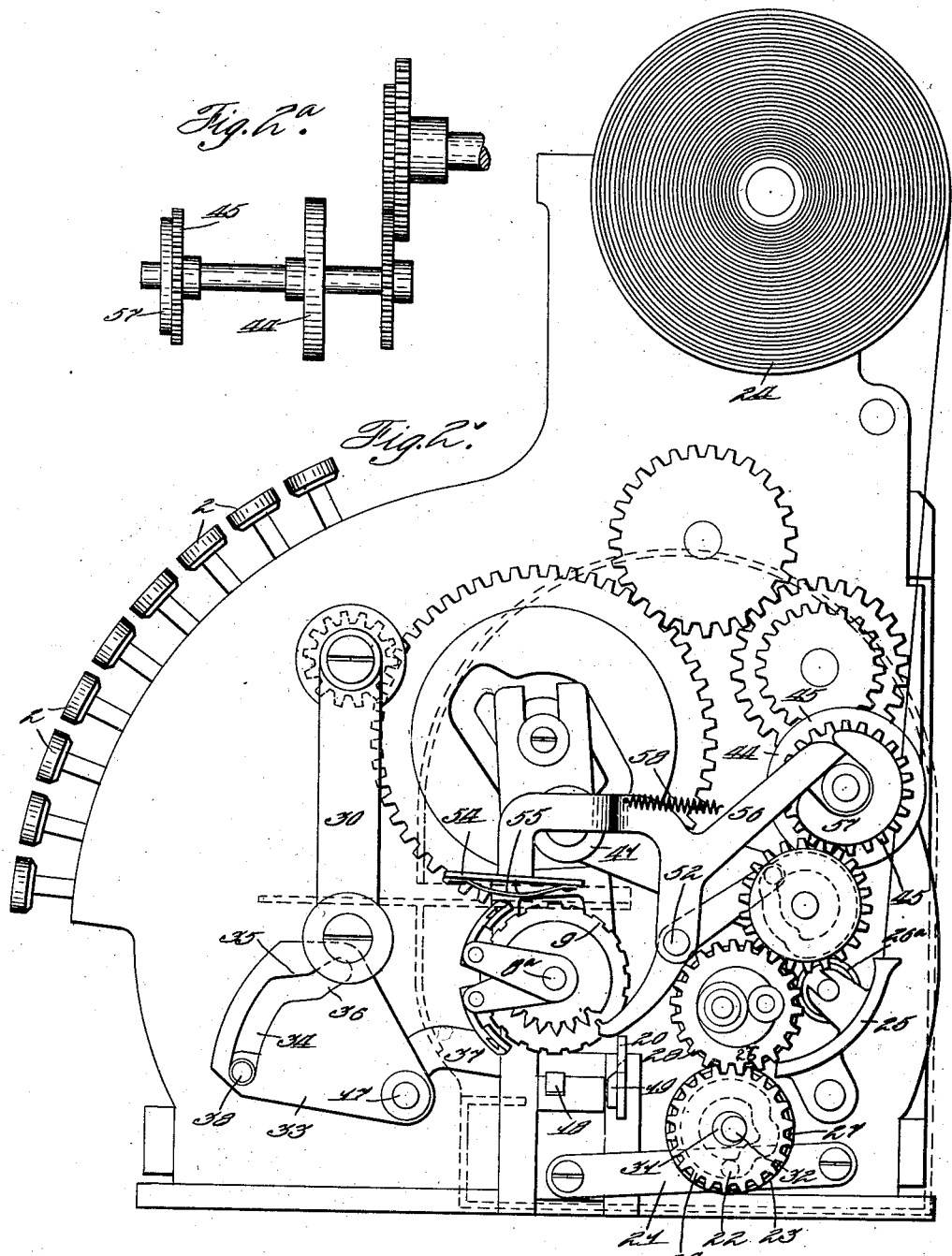

No. 833,825. PATENTED OCT. 23, 1906.
J. P. CLEAL.
CHECK AND SLIP PRINTING CASH REGISTER.
APPLICATION FILED MAR. 15, 1904.
3 SHEETS—SHEET 3.
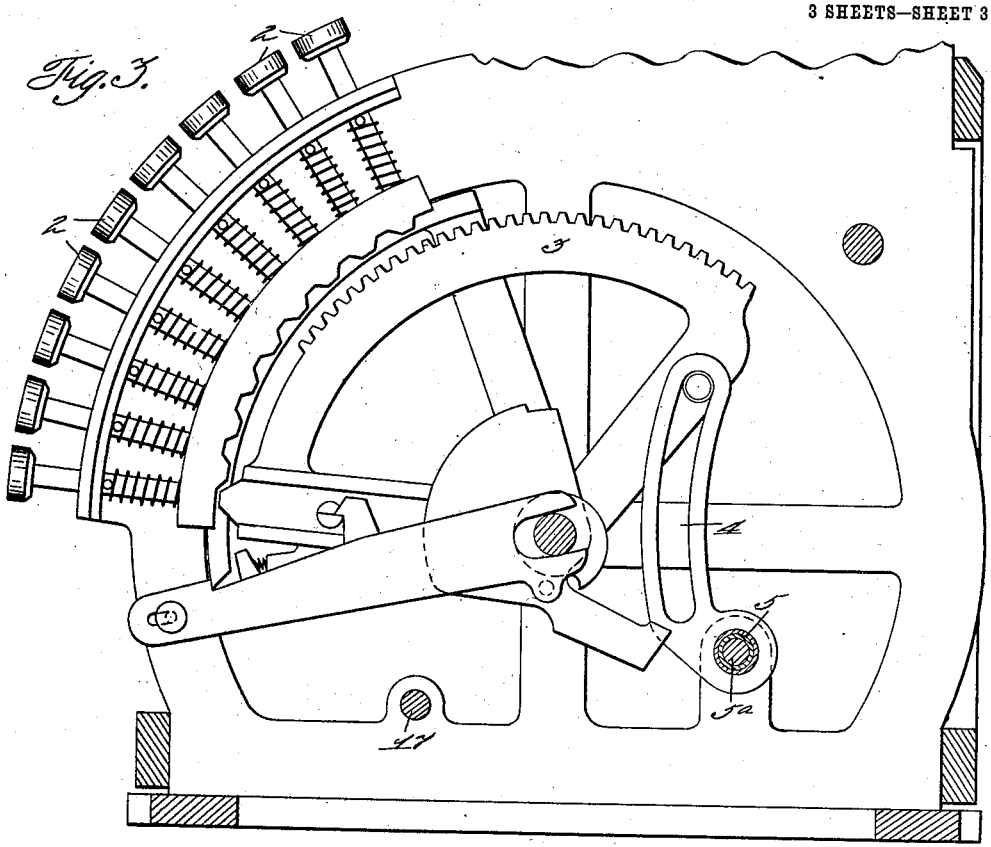
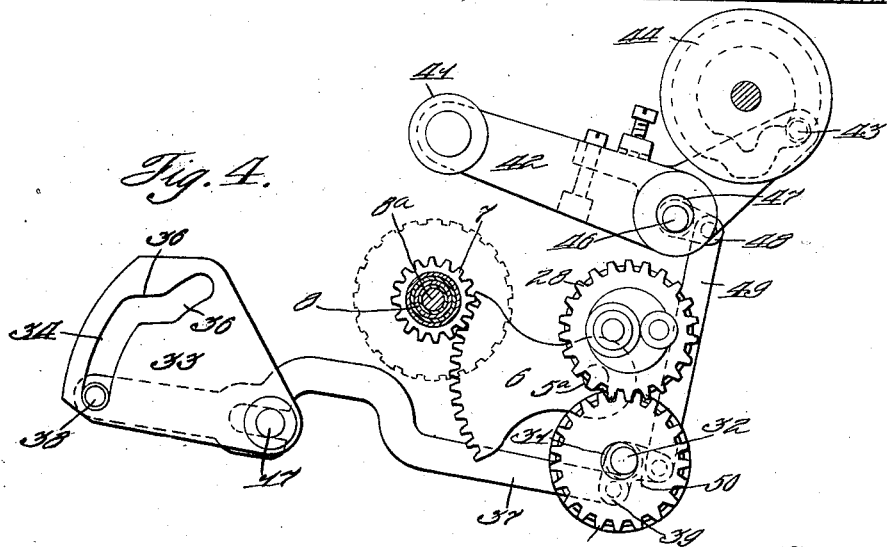
Witnesses
W. M. McCarthy
Wm. O. Henderson
Inventor
Joseph P. Cleal
Frank Parker Davis
J. B. Hayward Attorneys

UNITED STATES PATENT OFFICE.

JOSEPH P. CLEAL, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

CHECK AND SLIP PRINTING CASH-REGISTER.

No. 833,825.     Specification of Letters Patent.     Patented Oct. 23, 1906.

Application filed March 15, 1904. Serial No. 198,243.

*To all whom it may concern:*

Be it known that I, JOSEPH P. CLEAL, a citizen of the United States, residing at Dayton, in the county of Montgomery and State of Ohio, have invented certain new and useful Improvements in Check and Slip Printing Cash-Registers, of which I declare the following to be a full, clear, and exact description.

This invention has more particular reference to that class or type of machines known as "department-registers," because of providing for a classification of transactions according to the departments of a business; and the invention has in contemplation the printing and issuance of checks for a certain class or certain classes of transactions and the printing of inserted slips for other classes of transactions.

It is customary in machines of the type mentioned to provide selecting means which are first operated to effect the proper classification of the transaction, and the principal object of my present invention is to provide printing mechanism which will be governed in its functions by said selecting means.

More specifically stated, the purpose is to provide a cash-register which will print and issue checks in certain adjustments of the selecting means, whereas in other adjustments the check-issuing mechanism will be automatically disabled or rendered ineffective.

The purpose is also to provide, in conjunction with the check-printing mechanism, a slip-printing arrangement which while inoperative when the check mechanism is operative will be brought into play when the check-printing mechanism is disabled or rendered ineffective.

In order that the purposes of my invention may be thoroughly understood at the outset, a business system will be briefly explained wherein a machine having the functions above indicated will be useful: In a hotel having both a bar and café or grill-room a cash-register is used at the bar, not to receive cash, but for issuing checks showing the amounts of purchases which are registered and indicated, and these checks go to the customer to be then taken to a cashier, who receives the money to the amount of the checks. At the same time slips will be employed in the café or grill-room upon which will be written the items of orders for food. In connection with these latter transactions there will be no occasion for the issuance of checks from the machine. Still it is of course necessary that the machine register the amounts represented by these slips, and hence it is desirable that the machine be equipped for receiving the slips and printing upon them the totals of items written thereon while adding them into the counters. When the machine is operated to print upon these inserted slips, the check-printing mechanism is not necessary. The adaptability of my invention as above outlined to this kind of a system will be apparent.

In the present instance I have shown my invention applied to such a cash-register as llustrated in the patent to Thomas Carroll, No. 754,049, dated March 8, 1904, in which register a hand-lever moves along a scale to position one of a number of counters carried upon a reel, so that in the regular operation of the machine this counter will receive the registration. It is by means of the manipulation of this hand-lever that the machine is adjusted to the particular kind or character of transaction to be made.

In the accompanying drawings, which form a part of this specification, Figure 1 represents a machine of the type illustrated in the patent above mentioned in side elevation with the hood removed. Fig. 2 shows the same machine in side elevation, but viewed from the opposite end and the casing of the printing mechanism removed. Fig. 2ª shows certain gearing of this printing mechanism detached in rear elevation. Fig. 3 is a section taken from front to back of the machine, but with many parts omitted, this view simply serving to illustrate the connection between a bank of amount-keys and a type-carrying wheel. Fig. 4 is a sectional side elevation of part of the printing mechanism, including the particular devices for carrying out the present invention.

It will not be necessary to go into a detailed description of the register proper. For this reference may be had to the prior patent mentioned. It will be sufficient to state that in the type of machine illustrated there are a number of banks of keys, and for each bank there will be an oscillatory registering-segment the extent of whose excursion in an operation of the machine will depend upon the particular key operated.

In Fig. 3 the numeral 2 designates amount-keys of a bank, and 3 the oscillatory segment. This segment is coupled, through the medium of a slotted crank-arm 4, with one of a series of nested sleeves 5 on a shaft 5ª, which carries a toothed segment 6, Fig. 4, at the right-hand end of the machine. Similar segments are affixed to the several sleeves, as shown in patent above mentioned. The segment 6 is in mesh with a pinion 7 on the outermost of a series of nested sleeves 8, and the other segments mesh with similar pinions on the other sleeves and the shaft 8ª, which supports them. This shaft carries the units-of-cents type-wheel 9, Fig. 2, and similar type-wheels for tens of cents, units of dollars, and tens of dollars are carried by the three surrounding sleeves. It will be sufficiently obvious, without further description, that these printing-wheels will be adjusted to correspond with the depressed amount-keys. The innermost one of the sleeves 8 carries a special type-carrier for printing department indicia.

At the left-hand side or end of the machine outside of the main frame is journaled a rotatable reel 10, Fig. 1, which carries a series of counters 11. Any one of these counters may be brought into operative relation with the mechanism of the cash-register, so as to take the registration which is effected after certain amount-keys have been depressed and when the machine is fully operated. The adjustment or positioning of the reel is effected by manipulating a hand-lever 12, this lever having a bell-crank formation and being connected by a link 13 with the reel. This hand-lever is also connected by a link 15 with a crank-arm 16 on a shaft 17, carrying a cam-plate 16ª for reciprocating a link 16ᵇ, coupled to a crank-arm 16ᶜ, connected with the shaft 5ª, so as to rock the same and position the special type-carrier to accord with the adjustment of the lever 12. The latter works along a scale on the front of the machine, which will have designations for the different kinds of transactions.

Proceeding now to a more detailed description of the printer, reference will be first had to Fig. 2. The printing wheels or disks 9 appear here in side elevation, so that only the outermost one of the series is actually visible, this type-wheel coacting with the units-of-cents bank of keys. It will be sufficiently understood without further illustration that behind this type-wheel there will be a sufficient number of similar wheels for coacting with the other banks of amount-keys and an innermost type-wheel for printing the special designation for the transaction, this being the type-wheel heretofore mentioned as suitably coupled to the setting-lever. The type upon each of the wheels is duplicated, so that a line of type presented at one side from which to take an impression will be duplicated at the opposite side. The arrangement in this class of machines provides for these impressions being taken at the top and the bottom of the type-wheels, and the numeral 18 designates a platen mounted to reciprocate vertically in suitable slideways for coöperation with the lower sides of the type-wheels. This platen carries a knife-blade 19, which coöperates with a fixed blade 20, and the platen is reciprocated by a lever 21, pivoted at its rear end to the main frame of the machine and having at an intermediate point a pin 22 for coöperation with a box-cam 23. The numeral 24 designates a roll of suitable paper from which checks can be cut, and this strip is led down through a curved guideway 25, pivotally mounted upon the main frame. A pair of feed-rollers 26 27 are journaled upon the main frame so as to receive the strip from said guideway 25 and deliver it between the blades 19 20 of the cutter, the strip then passing between the platen 18 and the type-carriers. The said feed-rollers are operatively connected by intermeshing gear-wheels 28 29 and are driven through a train of gearing which connects them with the operating crank-handle 30 of the machine. The box-cam 23, heretofore mentioned, is compounded with the lower feed-roller 27, and in a complete revolution of the latter produced by the turning of the crank-handle 30 the lever 21 will be twice raised and lowered, first to ink and then to print. The bearings for the lower feed-roller 27 are adjustable so that coöperative relation between the platen and the type-wheels may be destroyed. This feed-roller is journaled upon an eccentric bearing 31, which is formed upon the supporting-shaft 32, and the latter is mounted in the main framework so as to be capable of oscillation. It will thus be seen that by oscillating this shaft the feed-roller and the box-cam 23 can be raised and lowered. This not only controls the relation between the platen 18 and the type-wheels, but also controls the relation between the feed-roller 27 and its mate 26. All of this construction is well known, but is described here in detail because the present invention is directly applied to this part of the mechanism. Turning on and off the check-feed by means of a knob rotatively engaged with the supporting-shaft is very well known. The present invention, however, provides for this supporting-shaft being rocked or oscillated as an accompaniment to certain adjustments of the setting-lever. This is effected through the following connections: The shaft 17, heretofore mentioned as being connected through crank-and-link devices to the setting-lever, extends entirely across the machine from the setting-lever side to the printer side, and just outside the main frame on the printer side of the machine said shaft has affixed to it a plate 33 of generally segmental form, which plate is formed with a cam-slot comprising an arc-shaped portion 34 concentric with the shaft 17, an angular portion 35, and another shorter arc-shaped portion 36, concentric with the shaft 17. A link 37, extending from front to rear of the machine, lies between the said segmental-plate 33 and the main frame and is provided with a roller-equipped pin 38, which occupies the cam-slot of said segmental plate. This link 37 is slotted, as shown in broken lines in Fig. 4, to embrace the shaft 17, which thus constitutes a guide for the link in its reciprocations. The rear end of the link 37 (see Fig. 4) is coupled to a short crank-arm 39 on the shaft 32.

The different positions of the setting-lever are definitely fixed by means of a notched plate 40, which in the present instance has six notches, the setting-lever being equipped with a spring-catch (see broken lines, Fig. 1) to engage in the notches in a well-known manner. Now it will be understood that the segmental plate 33 always moves with the setting-lever. In the machine illustrated so long as the setting-lever is moved within the range of the upper four notches of the plate 40 the roller-equipped pin 38 occupies the portion 34 of the cam-slot in the segmental plate 33, and obviously the link 37 stands forward and the shaft 32 consequently is turned forward, with the result that the feed-rollers 26 27 are adjusted to feed the check-strip to the printer. However, in passing downwardly from the fourth to the fifth notch of the plate 40 the setting-lever causes the angular part 35 of the cam-slot in the segmental plate 33 to traverse the pin 38, with the result that the link 37 is forced rearwardly. When the setting-lever is confined to its range of movement comprising the lower two notches of the plate 40, the pin 38 occupies the portion 36 of the cam-slot. Hence it follows that so long as the setting-lever is adjusted within the range of these lower two notches the check-feed will be interrupted, because when the link 37 moved rearward the shaft 32 was turned and the eccentric 31 separated the feed-roller 27 from the feed-roller 26. Furthermore, the lowering of the box-cam 23 destroys the coöperative relation between the platen 18 and the type-wheels. Upon the return of the setting-lever to the upper part of its range of movement of course the conditions first above described are reëstablished. It may be added that the upper feed-roller 26 carries type for printing on the check-strip as it passes between the rollers, and these latter constitute a printing-couple, as well as do the type-wheels and platens.

It will thus be seen that in so far as the invention aims to provide for controlling the issuance of checks by the adjustments of the setting-lever the construction above described supplies the desideratum. It will be remembered, however, that in addition to this it is proposed to provide for the printing of slips whenever the check mechanism is rendered ineffective. This printing of checks is done on the upper side of the type-wheels. The platen for this purpose is in the form of a roller 41, mounted upon the forward end of a lever 42, pivoted at an intermediate point and equipped at its rear end with a pin 43. The vibrations of the lever 42 are effected through the agency of a box-cam 44, embracing the pin 43 and compounded with one of the gears 45 of the train which connects the feed-rollers to the operating crank-handle of the machine. The said lever is supported by a shaft 46, being journaled upon an eccentric 47, which is part of said shaft, and this shaft is capable of oscillation, so as to raise or lower the lever. When elevated on its eccentric bearing, the vibrations of the lever 42 produced by the box-cam 44 will not carry the platen 41 against the type-wheels, but when lowered by the turning forward of the shaft 46 the lever, with its platen, is brought into coöperative relation with the type-wheels. In order to produce this relation as an accompaniment to the disabling of the check mechanism, a short crank-arm 48 on the shaft 46 is connected by a link 49 with a rearwardly-extending crank-arm 50 on the shaft 32, which is shown as integral with the arm 39, the two forming a bell-crank. It follows that when the link 37 is moved rearwardly and the lower feed-roller consequently displaced the link 49 is moved upwardly and the shaft 46 turned forward, so that the lever 42 is lowered slightly.

A casing for the printing mechanism is outlined in broken lines in Fig. 2, and of course provision is made for the issuance from said casing of the checks as they are printed and cut off underneath the type-wheels, and provision is also made for the insertion of a slip over the type-wheels to receive an imprint by the operation of the platen 41. In order to insure retaining an inserted slip at a fixed position during the printing, I provide a holding device of the following description: A two-armed lever is pivoted at 52 on a bearing-pin projecting from the main frame, and the forwardly-extending arm 53 of this lever is formed with a foot 54, positioned over the platform provided by the casing for the slip to lie upon, and this foot is equipped with a bowed spring 55 to bear upon the slip. A rearwardly-extending arm 56 of said slip-holding lever bears upon a disk-cam 57, which is compounded with the gear 45, being kept in engagement with said cam by a spiral spring 58. Normally the foot 54 of this two-armed lever is elevated by this spring, so as to permit free insertion of the slip. In the operation of the machine, however, the cam 57, acting upon the rearwardly-extending arm 56 of said lever, presses the foot upon the slip during the operation of printing.

The arrangement for alining the type-wheels and for inking the same is exactly the same as shown in the said prior patent and forms no part of the present invention. It may be added that the pivoted check-strip guide 25 carries an inking-roller 26ª for the type of the roller 26, and means similar to those shown in said patent will be employed to remove this inking-roller from contact with roller 26 when roller 27 is displaced.

It will be understood that the construction here described and illustrated in detail represents only one form of embodiment of my invention and that it is capable of being carried out in various ways. Hence in the claims which follow essential elements are recited without restriction to details of construction incidental to the embodiment of the invention in the particular form of machine which I have chosen to illustrate and describe in the present case.

Having thus described my invention, what I claim is—

1. In a machine of the character described, the combination with a printing-couple, means for bringing together the two members of said couple for effecting an impression, and manipulative selecting means for adjusting the machine for the accounting of differently-designated transactions; of means for preventing the bringing together of said two members of the printing-couple as an accompaniment to certain adjustments of the machine.

2. In a machine of the character described, the combination with a duplex printing mechanism the divisions of which are alternately operable, and manipulative selecting means for adjusting the machine for differently-designated transactions; of means for disabling one division of the printing mechanism as an accompaniment to certain adjustments of the machine and for simultaneously rendering effective the other division of said printing mechanism.

3. In a machine of the character described, the combination with a duplex printing mechanism the divisions of which are alternately operable, and manipulative selecting means for adjusting the machine for differently-designated transactions; of means for disabling one division of the printing mechanism as an accompaniment to certain adjustments of the machine and for simultaneously rendering effective the other division of said printing mechanism, and for reversing these conditions as an accompaniment to other adjustments of the machine.

4. In a machine of the character described, the combination with a printing-couple, means for bringing together the two members of said couple, and a manipulative selecting member differentially adjustable to various positions for differently-designated transactions; of means for disabling the printer as an accompaniment to the taking up of certain positions of adjustment by said manipulative member.

5. In a machine of the character described the combination with a printing-couple, means for bringing together the two members of said couple, and a manipulative selecting member movable to different positions of adjustment for designating different transactions; of means for rendering the printer inoperative when the said selecting member is in any one of a plurality of certain positions in its range of movement.

6. In a machine of the character described the combination with a printer including duplex impression members each adjustable into and out of operative relation with the type, and a manipulative selecting member adjustable to various positions for differently-designated transactions; of connections between said manipulative member and one of the impression members of the printer for rendering the latter inoperative in certain adjustments of the manipulative member, and connections between the two impression members of the printer rendering one operative when the other is disabled, substantially as described.

7. In a machine of the character described the combination of a printing mechanism comprising type and platen members with means for bringing the same into contact to produce an impression; a lever movable differentially for different transactions; and means operated by said lever in certain of its adjustments, to prevent the contact of said two members of the printing mechanism.

8. In a cash-register designed to issue a printed check or to print upon an inserted slip, the combination of a set of type-carriers from which impressions can be taken at different places under one adjustment; platens juxtapositioned to the type-carriers at these places; means for vibrating the platens adjustable to prevent coöperation between the same and the type-carriers; connections between the platen-vibrating means for rendering one effective when the other is ineffective; manipulative selecting means for adjusting the machine for differently-designated transactions; and connections between said means and the platen-vibrating means for controlling the alternating effectiveness thereof.

9. In a cash-register designed to issue a printed check or to print upon an inserted slip, the combination of a set of type-carriers from which impressions can be taken at different places under one adjustment; platens juxtapositioned to the type-carriers at these places; means for vibrating the platens adjustable to prevent coöperation between the same and the type-carriers; connections between the platen-vibrating means for rendering one effective when the other is ineffective; a manipulative selecting member movable to different positions of adjustment; and connections between said member and the platen-vibrating means for controlling the alternating effectiveness thereof.

10. In a cash-register designed to issue a printed check or to print upon an inserted slip, the combination of a set of type-carriers from which impressions can be taken at different places under one adjustment; platens juxtapositioned to the type-carriers at these places; means for vibrating the platens adjustable to prevent coöperation between the same and the type-carriers; connections between the platen-vibrating means for rendering one effective when the other is ineffective; a lever for adjusting the machine for differently-designated transactions; and connections between said lever and the platen-vibrating means for controlling the alternating effectiveness thereof.

11. In a machine of the character described the combination of strip-feed rollers geared together, an eccentric bearing for one of said rollers movable to destroy its coöperative relation with the other; a selecting-lever; and connections between the same and the eccentric-bearing whereby the feed is suspended when the lever is in certain positions.

12. In a machine of the character described, the combination of strip-feed rollers geared together, an eccentric bearing for one of said rollers movable to destroy its coöperative relation with the other; a selecting-lever; a pivoted cam-slotted plate geared thereto; and a link connection between the slotted plate and the eccentric bearing substantially as and for the purpose described.

13. In a machine of the character described the combination with a printing-couple comprising a set of type-carriers and a reciprocatory platen and operating-lever; and a strip-feed mechanism comprising a pair of rollers geared together, an oscillatory eccentric bearing for one of said rollers, and a cam compounded with said ecentrically-mounted roller and engaged with the platen-lever to vibrate the same; of a link cranked to the eccentric bearing of the feed-roller; a swinging cam-plate engaged with said link to reciprocate the same; and a selecting-lever connected with said cam-plate.

14. In a machine of the character described, the combination of a printer comprising type-carriers; a reciprocatory platen and its operating-lever; a second platen-carrying lever; a cam for vibrating the latter; an oscillatory eccentric bearing for said lever; feed-rollers geared together; an oscillatory eccentric bearing for one of said rollers; a cam compounded with said eccentrically-mounted roller to vibrate the first-named platen-lever; a link cranked to the two eccentric bearings; a selecting-lever; and connections between the same and one of said eccentric bearings.

15. In a machine of the character described, the combination of a printer comprising type-carriers; a reciprocatory platen and its operating-lever; a second platen-carrying lever; a cam for vibrating the latter; an oscillatory eccentric bearing for said lever; feed-rollers geared together; an oscillatory eccentric bearing for one of said rollers; a cam compounded with said eccentrically-mounted roller to vibrate the first-named platen-lever; a link cranked to the two eccentric bearings; a link cranked to one of the latter; a swinging cam-plate engaged with said last-named link; and a selecting-lever geared to said cam-plate.

16. In a machine of the character described, the combination with a slip-printing mechanism, of a vibratory slip-holder spring-retracted, and a cam in the operating-gearing of the machine arranged to press the holder upon the slip.

17. In a cash-register, the combination with an operating mechanism and a plurality of counters controlled thereby, of duplex printing devices alternately operable, and a manipulative device for predetermining on which counter a transaction shall be entered and rendering one or the other printing device operative and the remaining device inoperative.

18. In a cash-register, the combination with an operating mechanism, of a plurality of counters and duplex printing devices, all controlled by said operating mechanism, a manipulative device common to the counters and printing devices, and means controlled by said device for adjusting any counter and its corresponding printing device to operative relation with the operating mechanism.

19. In a cash-register, the combination with a plurality of counters and duplex printing devices alternately operable, of a manipulative setting device for adjusting one counter for operation, said device also determining which printing device shall be operated.

20. In a cash-register, the combination with an operating mechanism and a plurality of counters, of alternately-operative printing devices, a manipulative means for predetermining which counter shall be operated by the operating mechanism, said means also controlling the operative relation of the printing devices to said mechanism.

21. In a cash-register, the combination with an operating mechanism, of a plurality of counters, a manipulative device for placing any counter in position for operation, duplex printing devices operated by said mechanism, and means operated by said manipulative device for throwing the printing devices into and out of operative relation with the operating mechanism, said means constructed to allow operation of only one printing device at an operation.

22. In a cash-register, the combination with an operating mechanism, of a plurality of counters operated thereby, a manipulative device for setting any counter for operation, a duplex printing mechanism, the divisions of which are alternately operable, means for disabling one division of the printing mechanism, as an accompaniment to the setting of certain counters for operation and for rendering effective the other division, and for reversing the printing conditions as an accompaniment to the setting of certain other counters for operation.

23. In a cash-register, the combination with a printing-couple and means for bringing together the two members of said couple to effect an impression, of manipulative setting means to adjust the machine for the accounting of differently-designated transactions, and means operated by the movement of said means to certain positions for preventing the bringing together of the two members of the printing-couple.

In testimony whereof I affix my signature in the presence of two witnesses.

JOSEPH P. CLEAL.

Witnesses:
JOHN A. WERNER,
JOHN J. UNGVARY.